United States Patent [19]

Drozdyk et al.

[11] Patent Number: 5,106,796
[45] Date of Patent: Apr. 21, 1992

[54] LOW-FIRING CAPACITORS DIELECTRICS

[75] Inventors: Lorri Drozdyk, Hillsborough, N.C.; Ian Burn, Hockessin, Del.

[73] Assignee: E. I. Du Pont de Nemours and Company, Wilmington, Del.

[21] Appl. No.: 760,181

[22] Filed: Sep. 13, 1991

[51] Int. Cl.[5] .................. C04B 35/46; C04B 35/48; C04B 35/49

[52] U.S. Cl. .................. 501/137; 501/134; 501/135; 501/136; 501/138; 361/321; 428/901; 252/62.9

[58] Field of Search ............ 501/108, 112, 134, 135, 501/136, 137, 138; 361/320, 321; 428/451, 901; 252/62.9

[56] References Cited

U.S. PATENT DOCUMENTS

| | | | |
|---|---|---|---|
| 4,078,938 | 3/1978 | Yonezawa et al. | 106/39.5 |
| 4,544,644 | 10/1985 | Yamashita et al. | 501/134 |
| 4,704,373 | 11/1987 | Kinoshita et al. | 501/136 |
| 4,753,905 | 6/1988 | Nishioka et al. | 501/136 |
| 4,767,732 | 8/1988 | Furukawa et al. | 501/137 |
| 4,791,078 | 12/1988 | Saito et al. | 501/136 |
| 4,829,030 | 5/1989 | Ohya et al. | 501/134 |
| 4,897,373 | 1/1990 | Inoue et al. | 501/134 |
| 4,954,464 | 9/1990 | Choi | 501/134 |
| 4,959,333 | 9/1990 | Mori et al. | 501/136 |
| 5,004,715 | 4/1991 | Hakotani et al. | 501/136 |
| 5,006,956 | 4/1991 | Kawakita et al. | 361/321 |
| 5,011,803 | 4/1991 | Park et al. | 501/136 |

Primary Examiner—Mark L. Bell
Assistant Examiner—Michael Marcheschi

[57] ABSTRACT

A low firing dielectric composition containing an admixture of finely divided particles of manganese doped-lead iron-tungsten niobate, barium titanate and optionally an inorganic sintering aid, dispersed in an organic medium. This composition is useful for forming capacitors.

8 Claims, No Drawings

LOW-FIRING CAPACITORS DIELECTRICS

FIELD OF THE INVENTION

The invention is related to dielectric compositions. More particularly, the invention is related to low-firing dielectric compositions which are useful in making capacitors.

BACKGROUND OF THE INVENTION

It is well known in the prior art that solid solutions of lead iron tungstate [Pb(Fe$_{\frac{2}{3}}$W$_{\frac{1}{3}}$)], often referred to as PFW, and lead iron niobate [Pb(Fe$_{\frac{1}{2}}$Nb$_{\frac{1}{2}}$)], often referred to as PFN, have a high dielectric constant when sintered as disks, or as multilayer ceramic capacitors. It is also known that small additions, on the order of 1% or less, of various additives such as manganese oxide, silicon dioxide, zinc oxide, or nickel oxide have been used to reduce the dissipation factor (DF) and increase the insulation resistance of PFN-PFW solid solutions.

For example, U.S. Pat. No. 4,078,938 (Yonezawa et al.) describes compositions consisting essentially of 20 to 50 mole % PFW and 80 to 50% PFN which provide a dielectric constant over 5000 when sintered below 1000° C. as a disk or in a multilayer capacitor. The compositions may also contain small additions of $SiO_2$, NiO, ZnO, or a Mn-containing compound.

In U.S. Pat. No. 4,544,644 (Yamashita et al.), compositions are described consisting of solid solutions of PFN and PFW with inclusion of 0.5 to 10 mol % of M(Cu$_{\frac{1}{2}}$W$_{\frac{1}{2}}$), where M is at least one of Ba and Ca, and optionally 1.0% or less of manganese oxide. Dielectric constants as high as 30,000 were obtained on disc or multilayer capacitors fired between 860 ° C. and 950° C.

In U.S. Pat. No. 4,885,267 (Takahara et al.), two kinds of PFN-PFW solid solutions were sintered with a grain growth inhibitor selected from oxides of Dy, Gd, and Sm. High K compositions were obtained with decreased dependence of capacitance on temperature.

In E.P. 376,670 (Kanai et al.), high K compositions are disclosed with low temperature coefficient of capacitance comprising a lead-based perovskite as a major component and an aluminoborosilicate glass containing MgO and BaO. The composition may also contain barium titanate as a major component. Disk capacitors were fired at temperatures between 1000 ° C. and 1200° C.

And, U.S. Pat. No. 4,772,985 (Yasumoto et al.) discloses high K thick-film capacitor compositions comprising at least one ferroelectric compound having a perovskite structure and a low melting eutectic inorganic binder.

However, it was found that when PFN-PFW doped with manganese oxide was used as thick-film dielectric on alumina substrates, poor dielectric properties were obtained when the capacitors were processed using a variety of commercial high Ag conductors. It is believed that the inorganic bonding agents in the conductor composition, which are added to achieve adhesion to the alumina substrate, react with the PFN-PFW during the firing process and adversely affect the performance of the dielectric by reducing the dielectric constant (K) and insulation resistance.

It is therefore an object of the invention to provide high K dielectric compositions containing PFN-PFW solid solutions which fire at a temperature below 950° C. and can be used with commercial thick film conductors.

SUMMARY OF THE INVENTION

In its primary aspect, the invention is directed to a low-firing composition for making high K dielectric bodies, which composition consists essentially of:

an admixture of finely divided particles comprising 99–1 weight percent, basis total solids, manganese doped lead iron-tungsten niobate, 1–99 weight percent, basis total solids, barium titanate, and optionally, an inorganic bonding agent consisting essentially of 0–7 weight percent, basis total solids, bismuth oxide and/or 0–1 weight percent, basis total solids, copper oxide;

dispersed in an organic medium.

In another aspect, the invention is directed to dielectric layers made by firing the above-described composition.

In a still further aspect, the invention is directed to multilayer elements comprising a plurality of internal metallic conductive layers separated by the above-described dielectric layers.

DETAILED DESCRIPTION OF THE INVENTION

Thick film dielectric compositions which can be processed with high silver conductors at a temperature of about 925° C., or lower have been developed. The compositions contain a mixture of finely divided manganese doped lead iron-tungsten niobate and barium titanate in an organic medium, with optional inorganic sintering aids such as bismuth oxide and copper oxide. An addition of above about 1 weight percent barium titanate to the lead iron-tungsten niobate was found to increase the dielectric constant to above about 4000 with an insulation resistance above 1 G ohm. Additions of lead iron-tungsten niobate to barium titanate were found to increase the dielectric constant of the barium titanate above about 1500 while maintaining surprisingly good temperature stability.

The lead iron-tungsten niobate is a solid solution containing PFN, PFW and 0.01–1.0 weight percent manganese oxide. Various additives such as silicon dioxide, zinc oxide or nickel oxide may be included in the solid solution in amounts of about 1 weight percent or less.

The amount of lead iron-tungsten niobate varies from 1–99 weight percent, basis total solids. Compositions containing a high concentration of lead iron-tungsten niobate, for example 99–95 weight percent, preferably 97.5 weight percent and a complementary amount of barium titanate, 1–5 weight percent, preferably 2.5 weight percent, fire at temperatures below 950° C. to form dielectric bodies having a K of 4000 or greater. Barium titanate compositions containing 25–50 weight percent, basis total solids, lead iron-tungsten niobate and a sintering aid in the amount of 5 weight percent or less also fire at temperatures below 950° C. to form dielectric bodies having a K of 1500 or greater and good temperature stability.

Sintering aids such as bismuth oxide and copper oxide may be used in compositions of the invention. Amounts of 0–7 weight percent, basis total solids, bismuth oxide and/or 0–1 weight percent, basis total solids, copper oxide are suitable. As the amount of barium titanate in the composition increases, the desirability of sintering aid in the composition also increases. Lead oxide is an unsuitable sintering aid because an excess of lead oxide cause poor reliability in the fired dielectric body.

The solids in the composition are added as finely divided particles. The average particle size is usually of no more than 2 microns, and preferably no more than 1.5 micron. On the other hand, when the average particle size of the solids is below about 0.5 micron, the particles become difficult to process and are therefore less suitable. An average particle size of 0.5–1.5 microns is therefore preferred.

To form the composition of the invention, the finely divided solid particles are dispersed in an organic medium. Depending upon the choice of organic medium, the dispersion may be useful as a thick film paste or as a casting solution for an unfired sheet.

When the dispersion is to be applied as a thick film paste, conventional thick film organic media can be used with appropriate rheological adjustments and the use of lower volatility solvents. In this event, the compositions must have appropriate viscosity so that they can be passed through a screen readily. In addition, they should be thixotropic in order that they set up rapidly after being screen printed, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of liquids can be used as organic medium. The organic medium for most thick film compositions is typically a solution of resin in a solvent, frequently also containing thixotropic agents and wetting agents. The solvent usually boils within the range of 130°–350° C. See, for example, U.S. Pat. No. 4,959,330.

The most widely used solvents for thick film applications are terpenes such as alpha- or betaterpineol or mixtures thereof with other solvents such as mineral spirits, dibutylphthalate, butyl carbitol, butyl carbitol acetate, hexylene glycol and high boiling alcohols and alcohol esters. Various combinations of these and other solvents are formulated to obtain the desired viscosity and volatility.

Especially suitable resins for this purpose are those based on ethyl cellulose, mixtures of ethyl cellulose and phenolic resins, or polymethacrylates of lower alcohols.

Among the thixotropic agents which are commonly used are hydrogenated castor oil and derivatives thereof. It is, of course, not always necessary to incorporate a thixotropic agent since the solvent/resin properties coupled with the shear thinning inherent in any suspension may alone be suitable in this regard. Suitable wetting agents includes phosphate esters and soya lecithin.

The ratio of organic medium to inorganic solids in the dispersions can vary considerably and depends upon the manner in which the dispersion is to be applied and the kind of organic medium used. Normally, to achieve good coverage, the dispersions will contain complimentally by weight 60–90% solids and 40–10 organic medium. Such dispersions are usually of semifluid consistency and are referred to commonly as "pastes".

The pastes are conveniently prepared on a three-roll mill. The viscosity of the pastes is typically within the range of 100–800 Pa.S when measured at room temperature on a Brookfield HBT viscometer using a #14 spindle and 6R cup at 10 rpm.

The amount and type of organic medium utilized is determined mainly by the final desired formulation viscosity and print thickness.

Unfired dielectric sheets of the dielectric composition of the invention are made by casting a dispersion of the dielectric solids in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% wt. polymer binder for 95% wt. ceramic solids. However, it is further preferred to use no more than 20% wt. polymer binder in 80% wt. ceramic solids. Within these limits, it is desirable to use the least possible amount of binder vis-a-vis solids in order to reduce the amount of organics which must be removed by pyrolysis.

In the past, various polymeric materials have been employed as the binder for dielectric sheets, e.g., (poly)-vinyl butyral, (poly)vinyl acetate, (poly)vinyl alcohol, cellulosic polymers such as methyl cellulose, ethyl cellulose, hydroxyethyl cellulose, methylhydroxyethyl cellulose, atactic polypropylene, polyethylene, silicon polymers such as (poly)methyl siloxane, (poly)methylphenyl siloxane, polystyrene, butadiene/styrene copolymer, polystyrene, (poly)vinyl pyrollidone, polyamides, high molecular weight polyethers, copolymers of ethylene oxide and propylene oxide, polyacrylamides, and various acrylic polymers such as sodium polyacrylate, (poly)lower alkyl acrylates, (poly)lower alkyl methacrylates and various copolymers and multipolymers of lower alkyl acrylates and methacrylates. Copolymers of ethyl methacrylate and methyl acrylate and terpolymers of ethyl acrylate, methyl methacrylate and methacrylic acid have been previously been used as binders for slip casting materials.

More recently, Usala, in U.S. Pat. No. 4,613,648 has disclosed an organic binder which is a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine. Because the polymers permit the use of minimum amounts of binder and maximum amounts of dielectric solids, their use is preferred with the dielectric composition of this invention.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate, 2,2,4-triethyl pentanediol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glyecerol, (poly)ethylene oxides, hydroxyethylated alkyl phenol, dialkyldithiophosphonate and (poly)isobutylene. Of these, butyl benzyl phthalate is most frequently used in acrylic polymer systems because it can be used effectively in relatively small concentrations.

Devices such as circuits and capacitors can be fabricated from electrically conductive metallizations and either unfired dielectric sheets or thick film dielectric pastes. For example, a metallization can be printed in the desired pattern upon an unfired dielectric sheet. The printed sheets are stacked, laminated and cut to form the desired structures. The assemblage is then fired to effect removal of the organic medium from the metallization material and of the organic binder from the dielectric material, and to sinter the dielectric material. The removal of the organics is accomplished by a combination of evaporation and thermal decomposition during the firing operation. In some instances, it may also be desirable to interpose a preliminary drying step prior to firing.

When firing the above-described assemblages with high silver metallizations, it is preferred to employ a first firing step in which the assemblage is heated slowly to 100°–550° C. which will be effective to remove all of the organic material without damage to the laminated assemblage. Typically the organic burnout period is 18–24 hours to assure complete removal of organics. When this has been completed, the assemblage is then heated more rapidly to the desired sintering temperature.

For manufacturing devices from thick film pastes, an electrically conductive paste is screen printed in the desired pattern onto a rigid dielectric substrate such as an alumina plate. The assemblage is fired to remove organic medium and sinter inorganic conductive material. A thick film dielectric paste of the invention is then screen printed in the desired pattern over the patterned conductive layer and exposed parts of the dielectric substrate, and the assemblage is fired to remove organic medium and sinter inorganic dielectric material. The steps of screen-printing a thick film paste layer then firing the assemblages is repeated until the desired number of layers is achieved.

The sintering temperature is determined by the physical and chemical characteristics of the dielectric material and the melting point of the conductive material which is usually a metallization. Ordinarily the sintering temperature will be chosen to obtain maximum densification of the dielectric material while staying below the melting point of the metallization. For the dielectric compositions of this invention, the temperature will range from 800° C. to 950° C. However, it will be recognized by those skilled in the art of fabricating electrical devices that maximum densification is not always needed. Therefore, the term "sintering temperature" refers to the temperature (and implicitly the amount of time as well) to obtain the desired degree of densification of the dielectric material for the particular application. Sintering times also vary with the dielectric composition but ordinarily about 0.25–0.50 hr at the sintering temperature is preferred for thick films, and 0.5–2.5 hr for tape.

Peak firing temperatures of below 950° C., preferably between 850° C. and 925° C., are suitable for making devices with high silver metallizations. Such low firing temperatures are below the melting point of the silver metal thereby avoiding migration of the metal.

Upon completion of sintering, the rate of cooling to ambient temperature is carefully controlled in accordance with resistance of the compounds to thermal shock.

EXAMPLES

All "Du Pont" products are from E.I du Pont de Nemours and Co., Inc., Wilmington, Del.

EXAMPLE 1

A manganese doped PFN-PFW solid solution was made by the following method. A mixture of 600.0 g of PbO, 107.18 g of $Nb_2O_5$, 119.54 g of $Fe_2O_3$, 80.23 g $WO_{2.9}$, and 3.00 g $MnCO_3$, was blended in isopropyl alcohol for 5 hr and then dried overnight. The mixed powder was then calcined at 800° C. for 5 hr and subsequently ball-milled for 16 hr in isopropyl alcohol to reduce the particle size ($D_{50}$) to under 2 microns. A thick film paste was made by roll-milling 45.0 g of the powder with 8.5 g of a conventional ethyl cellulose-based organic medium. Screen-printed capacitors were formed by first printing a bottom conductor of Ag/Pt paste (Du Pont 9770) on to an alumina substrate and then firing at 850° C. (45 min cycle). Two layers of dielectric paste were printed and fired consecutively at 925° C., and then a top conductor layer as fired on at 850° C. The capacitors were coated with silicone oil for testing. Dielectric constant was calculated to be 2370, DF was 2.5%, and insulation resistance (I.R.) was 1 G.ohm (44 ohm.farads).

EXAMPLE 2

A thick film dielectric paste was made as in Example 1 but 2.5 g of submicron barium titanate powder (Fuji Titanium Co.) was also added. Capacitors were prepared as in Example 1. Dielectric constant was 4500, DF was 3.3%, and I.R. was 2.3 G.ohm (200 ohm.farads). This experiment indicated that a significant increase in K and IR could be obtained by the addition of barium titanate to the PFN-PFW composition.

EXAMPLES 3–6

Thick film pastes were made with PFN-PFW powder of the same composition as in Examples 1 and 2, together with 2.7 weight percent barium titanate and one of the following sintering aids: 1.07% (of total solids weight) lead oxide, 1.07% bismuth oxide, or 0.43% copper oxide. Thick film capacitors were made with each paste using Du Pont 9770 Ag/Pt conductors. Three separate layers of dielectric were printed, dried and fired for each capacitor. The peak firing temperature was 850° C. Each capacitor was then encapsulated, first with one layer of Du Pont 5520D thick film dielectric paste and then with one layer of Du Pont 9615 thick film glass encapsulant. Each encapsulant layer was fired at 850° C. Averaged electrical data are given in Table 1 together with results of highly accelerated life-testing at 200 V and 150° C. for 48 hours. These data indicate the following: (1) inclusion of excess lead oxide in the composition as a sintering aid can lead to poor reliability, (2) bismuth oxide additions to the PFN-PFW can lower K slightly, and (3) copper oxide additions can increase K slightly.

TABLE 1

Data for PFN-PFW/Barium Titanate Mixtures with Various Oxide Additions

| Sintering Aid | Example 3 none | Example 4 lead oxide | Example 5 bismuth oxide | Example 6 copper oxide |
|---|---|---|---|---|
| Cap. (pF) | 61,400 | 61,600 | 52,900 | 68,300 |
| K | 5700 | 5700 | 4800 | 6100 |
| DF (%) | 0.86 | 0.62 | 0.47 | 1.37 |
| I.R. (GΩ) | 12 | 6 | 13 | 13 |
| Life-Test Failures | 0 | 50% | 0 | 0 |

EXAMPLES 7-10

Thick film dielectric pastes were made with mixtures of barium titanate and the PFN-PFW material described in Example 1. Inorganic bonding agents were also added, comprising (with respect to the total inorganic solids) 4.9 weight percent bismuth oxide and 0.1 weight percent copper oxide. The ratio of PFN-PFW to barium titanate varied from 0 to 50 weight percent. These compositions were printed and fired as in Example 1. The results are summarized in Table 2.

TABLE 2

Data for Additions of PFN-PFW to Barium Titanate

| PFN-PFW/BT | Example 7 0/100 | Example 8 25/75 | Example 9 35/65 | Example 10 50/50 |
|---|---|---|---|---|
| K | 1320 | 1920 | 2000 | 2160 |
| DF (%) | 2.27 | 1.51 | 1.64 | 2.02 |
| IR (Ω.F) | 83 | 358 | 304 | 153 |
| Cap. (pF) | 16,568 | 25,279 | 26,622 | 29,279 |
| TCC (%) | | | | |
| at 125° C. | +20 | +15 | +18 | +18 |
| at −55° C. | −27 | −25 | −24 | −24 |

These data show that K and IR are increased by the PFN-PFW additions to the barium titanate-based compositions and that good temperature stability is maintained.

EXAMPLE 11

A dielectric sheet was made from the powder composition described in Example 3. The sheet was cast on to a polypropylene carrier from a slurry of the powder in 1-1-1 trichloroethane and Du Pont 5200 binder solution, using conventional procedures. Multilayer capacitors were made from the sheet by screen-printing Ag electrode paste on to the tape and then laminating six layers of printed tape inside several layers of non-printed tape. The capacitors were fired at 900° C. for 2.5 hours on zirconia sand and then terminated with Du Pont 4506 Ag termination paste, which was fired on at 700° C. Average capacitance of the finished capacitors, in which the dielectric layers were 20 μm thick, was 55 nF with a DF of 0.7%. Insulation resistance was 13 G.ohms and the calculated dielectric constant was 8600.

EXAMPLE 12

Capacitors were made as in Example 11 but the powder composition of Example 6 was used. Also, the capacitors were fired at 850° C. instead of 900° C. Capacitance was 51 nF with a DF of 0.55%. The insulation resistance was 5 G.ohms and the calculated dielectric constant was 7350.

What is claimed is:

1. A low-firing composition for making high K dielectric bodies, said composition consisting essentially of:
   an admixture of finely divided particles comprising:
   99-1 weight percent, basis total solids, manganese doped-lead iron-tungsten niobate,
   1-99 weight percent, basis total solids, barium titanate, and
   optionally, an inorganic bonding agent consisting essentially of 0-7 weight percent, basis total solids, bismuth oxide and/or 0-1 weight percent, basis total solids, copper oxide;
   dispersed in an organic medium.

2. A composition of claim 1 wherein the admixture of finely divided particles comprises:
   99-95 weight percent, basis total solids, manganese doped lead iron-tungsten niobate, and 1-5 weight percent, basis total solids, barium titanate.

3. A composition of claim 1 wherein the admixture of finely divided particles comprises:
   96.9 weight percent manganese doped lead iron-tungsten niobate,
   2.7 weight percent barium titanate, and
   0.4 weight percent copper oxide.

4. A composition of claim 1 wherein the admixture of finely divided particles comprises:
   23.75-47.5 weight percent, basis total solids, manganese doped lead iron-tungsten niobate, and
   71.25-47.5 weight percent, basis total solids, barium titanate.

5. A dielectric thick film paste comprising the composition of claim 1 in which the admixture is dispersed in an organic medium comprising a solution of a resin in a low volatility solvent.

6. A slip-casting composition comprising the composition of claim 1 wherein the admixture is dispersed in an organic medium comprising a solution of volatile organic solvent and organic polymeric binder and the dispersion is of slip-casting consistency.

7. A dielectric sheet comprising a cast layer of the composition of claim 6 which has been heated to remove the volatile organic solvent.

8. A multilayer element comprising a plurality of internal thick film high silver metallic conductive layers separated by layers of the dielectric composition of claim 1, both the dielectric and conductive layers having been fired at a temperature below the melting point of the conductive metal to volatilize organic medium therefrom and to sinter the dielectric materials without melting the conductive metal.

* * * * *